Nov. 20, 1956      C. A. LA PERE     2,771,304
COMBINED MUD-GUARD AND STONE DEFLECTOR FOR
TRUCK TWO-WHEEL ASSEMBLY

Filed June 14, 1955                           2 Sheets-Sheet 1

INVENTOR.
CLARENCE A. LAPERE
BY Louis Chayka
ATTORNEY

Nov. 20, 1956

C. A. LA PERE 2,771,304

COMBINED MUD-GUARD AND STONE DEFLECTOR FOR
TRUCK TWO-WHEEL ASSEMBLY

Filed June 14, 1955

INVENTOR.
CLARENCE A. LAPERE

BY Louis Chayka

ATTORNEY

# United States Patent Office 2,771,304
Patented Nov. 20, 1956

2,771,304

COMBINED MUD-GUARD AND STONE DEFLECTOR FOR TRUCK TWO-WHEEL ASSEMBLY

Clarence A. La Pere, Ecorse, Mich.

Application June 14, 1955, Serial No. 515,391

3 Claims. (Cl. 280—152)

The improvement pertains to a device to be used in combination with the traction wheels of a heavy automobile vehicle, such as a truck. It is well known that the tires of trucks, especially heavy treaded tires, are apt, in the course of their rotary contact with a road, to pick up pebbles and small rocks. Because of the centrifugal action and the speed of the rotation of the wheels, said pebbles and rocks are often thrown rearwardly with a sufficient force to injure a person or to shatter glass in a vehicle rearwardly of the truck.

The primary object of the invention is to prevent such occurrences by means which include a deflector and a fender-like guard, the two items forming a combination to effectively deflect said pebbles and rocks or similar objects to a ground area immediately to the rear of the vehicle.

I shall now describe my improvement with reference to the accompanying drawings in which.

Similar numerals refer to similar parts throughout the several views.

Figure 2:
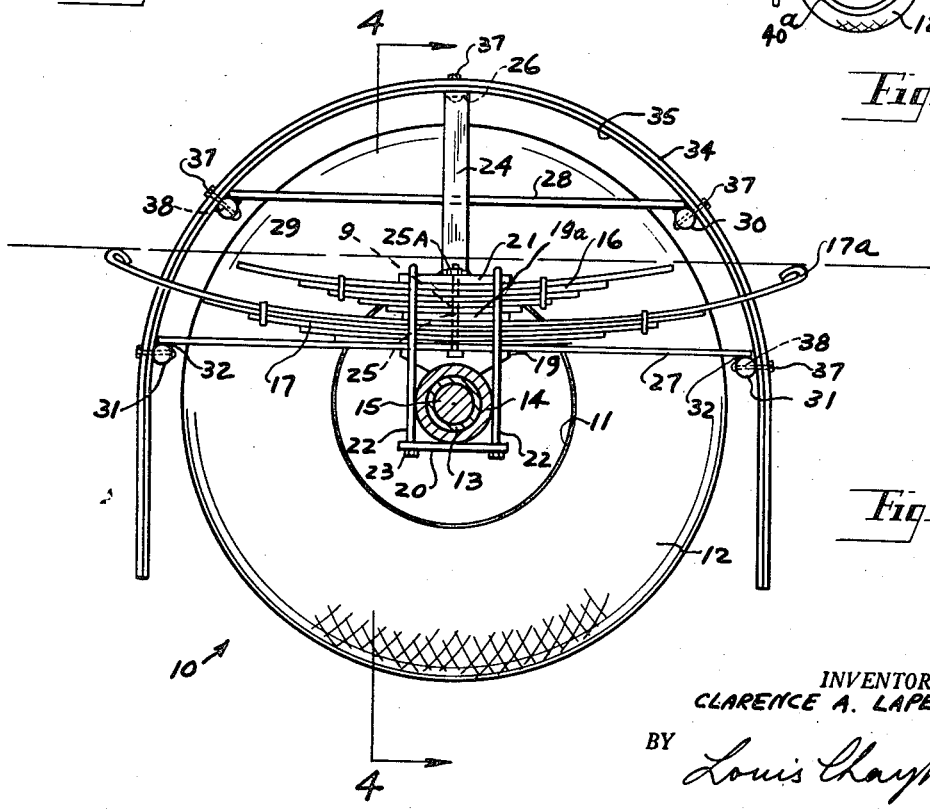
Fig. 2 is a side elevational view of the two-wheel assembly, including the rear axle and semi-elliptical leaf springs mounted thereon, the view disclosing means for support of a guard over the wheels.

Prior to the disclosure of the inventive features of my improvement, I wish to refer to Fig. 2 wherein the inner wheel 10 in a two-wheel assembly includes a rim 11 and a tire 12. The wheel is mounted in the customary manner upon axle 13 contained in a tubular housing 14 within a bearing 15. Numeral 10a identifies the outer wheel. Numerals 16 and 17 indicate two sets of elliptical leaf springs mounted upon the axle.

Means used for that purpose include a block 19 disposed over the housing 14 and serving to support the two sets of springs. The two sets, 16 and 17, are separated by means of a plate 19a and are clamped to said block, by means of two U-shaped units 22 each including two free ends which pass through apertures in a bar 20 and are threaded for application of tightening nuts 23. This is best shown in Fig. 2.

Figure 4:
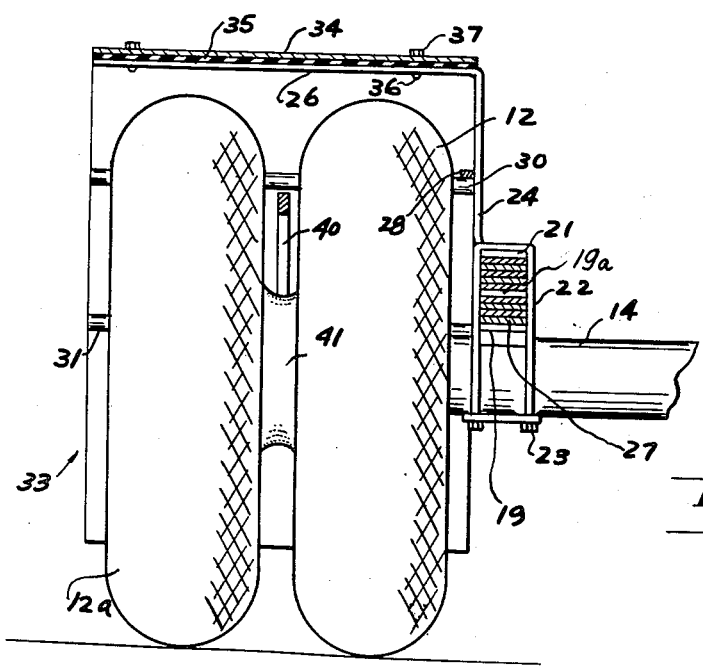
Fig. 4 is a sectional view on line 4—4 of Fig. 2.

Disposed upon the upper set of the springs and clamped in place by means of said units 22 is a plate 21, and rising therefrom is a standard 24 which, at its lower end, is welded to said plate. A hole in the plate 21 serves for reception of a bolt 25 to which I shall presently refer. At the top, the standard includes an arm 26 extending horizontally over the two-wheel assembly in a spaced relation thereto, as best shown in Fig. 4.

Resting upon the aforementioned block 19 under the lower set 17 of the leaf springs is a horizontal bar 27, the bar being tied to the above-said base plate 21 by means of said bolt 25 which, inserted from below through a bore 9 through the individual springs in both sets 16 and 17, is retained in place by means of a nut 25a.

A similar horizontal bar 28 is welded to said standard 24 above the upper set 16 of leaf springs in a spaced relation thereto and in a parallel relation to the lower bar 27.

Figure 3:
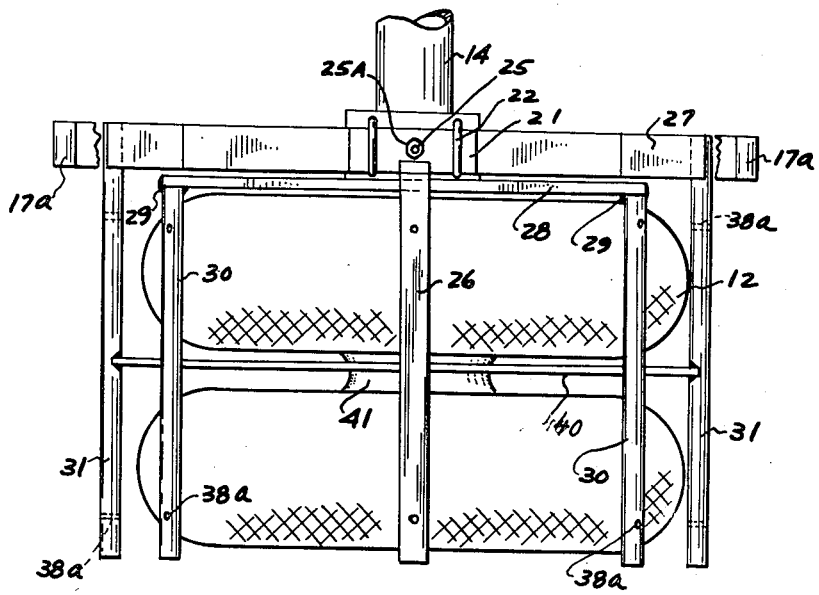
Fig. 3 is a top elevational view of the two-wheel assembly, the view disclosing the axle, the deflector, and means for support of a guard over the wheels.

Extending at right angle from each end of the upper bar 28, and being welded thereto as shown at 29, is a rod 30, the two rods being parallel to each other and extending over the two-wheel assembly, as best shown in Fig. 3. Similarly, two such rods 31 extend at right angle from the ends of the lower bar 27 to which they are welded, as shown at 32.

Both sets of rods, 30 and 31, and the above-said arm 26 of the standard 24, are employed as a means for support of a substantially semi-circular hood or guard, generally indicated by numeral 33. The guard includes an outer layer 34 of sheet metal and an inner lining 35, preferably made of rubber or some other comparably soft and resilient material, and is wide enough to cover both tires 12 and 12a crosswise, as shown in Fig. 4. The guard is secured to the arm 26 by means of bolts 38 and nuts 37. Similarly, bolts 38 and nuts 37 are used to secure the guard to rods 30 and 31 which, for the purpose, are provided with diametrical holes 38a.

Figure 1:
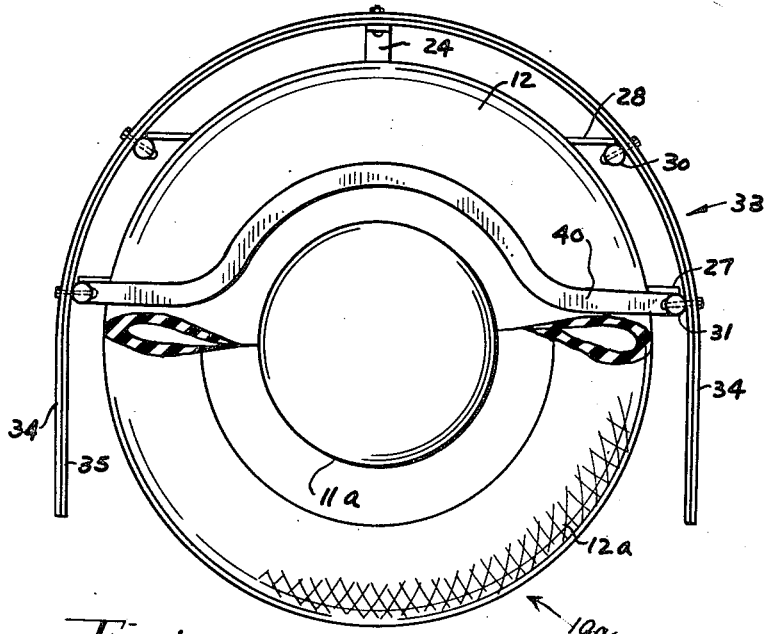
Fig. 1 is a side elevational view of a conventional two-wheel assembly at one end of the rear axle of the truck, in which view the tire of the outside wheel is shown in fragment in order to disclose a deflector in the space between the two wheels.
Figure 5:
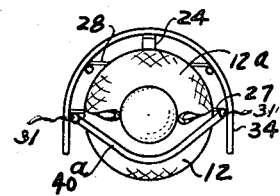
Fig. 5 is a side elevational view similar to that shown in Fig. 1, but discloses an element in a different position.

Disposed in the space between the two wheels and attached at its ends to rods 31, intermediate the ends of the respective rods, is a deflector 40. The deflector consists of a single, solid metal bar, preferably curving over the hub-portion 41 of the two-wheel assembly, as shown in Figs. 1 and 4. A modified species of the deflector, marked 40a, is shown in Fig. 5 where said deflector, attached at its ends to rods 31, dips below the hub portion of the wheels.

The important feature of the construction described above resides in the fact that the guard, as a whole, is mounted on the axle and not on the frame of the body of the truck, so that as a result the deflector 40 is always in the same relative position to the wheels, irrespective of any bouncing of the body of the truck. Thus, the efficiency of the combined guard and the deflector is always the same, irrespective of the movement of the framework or the body of the truck in relation to the wheels.

After having described my improvement, what I wish to claim is as follows:

1. In a two-wheel assembly at one end of the rear axle in a truck, a vertical standard supported by intermediate means upon the rear axle, a horizontal bar disposed over the axle transversely thereto and supported upon said axle by intermediate means, another or upper horizontal bar extending crosswise to the standard and affixed thereto, a transverse rod extending from each end of the first-named horizontal bar and a similar rod extending from each end of the upper horizontal bar, all the rods extending transversely over the wheels, a rock deflector consisting of a single bar attached at its ends to the lower pair of rods, intermediate their ends, the rod being disposed within the space between the two wheels in a spaced relation to the hub portion thereof, and a sheet metal guard mounted upon said rods, the guard forming a semi-circular structure over the wheels and the deflector therebetween.

2. In combination with a two-wheel assembly at one end of the rear axle of a truck, the assembly including a set of elliptical leaf springs for support of the frame of the truck, a horizontal bar disposed beneath the set of springs crosswise to the axle, a vertical standard mounted upon the set of said springs and including, at the top, a horizontal arm extending crosswise above and over the set of wheels, another horizontal bar extending crosswise to the standard and connected thereto, a pair of rods extending from each horizontal bar, one rod from each end of the respective bar, the rods extending transversely to the wheels in a spaced relation thereto, a rock deflector consisting of a single bar attached at its end to the two rods extending from the first-named horizontal bar, the deflector being disposed between the two wheels and dipping below the axle, and a sheet metal guard mounted upon the horizontal arm of the standard and the two pairs of transverse rods, the guard forming a semi-circular structure over the wheels and the deflector located therebetween.

3. In combination with a two-wheel assembly at one end of the rear axle of a truck, the assembly including a housing for the axle, a set of elliptical leaf springs mounted upon the housing for support of the framework of the truck, a horizontal bar mounted upon the housing beneath the springs crosswise to the housing, a vertical standard clamped to the springs at the top thereof and including an arm extending horizontally over the wheels transversely thereto, an upper horizontal bar extending crosswise to the standard and supported thereby, a pair of rods extending from each horizontal bar, one rod extending from each end of the respective bar, the rods extending transversely to the wheels in a spaced relation thereto, a rock deflector consisting of a single bar attached at its ends to the rods extending from the ends of the first-named bar, the deflector being disposed between the wheels and in a spaced relation to the hub portion of the wheels, and a sheet metal guard mounted upon the horizontal arm of the standard and the two pairs of rods, the guard including a lining of rubber and forming a semi-circular structure over the wheels and the deflector located therebetween.

References Cited in the file of this patent

UNITED STATES PATENTS

| 1,454,738 | Hilton | May 8, 1923 |
| 2,356,292 | Wildman | Aug. 22, 1944 |

FOREIGN PATENTS

| 9,566 | Great Britain | July 11, 1891 |
| 572,893 | France | Feb. 29, 1924 |